(12) United States Patent
Wells et al.

(10) Patent No.: US 8,726,277 B2
(45) Date of Patent: May 13, 2014

(54) DOMAIN CONTROLLER SAFETY-FEATURES AND CLONING

(75) Inventors: Dean Anthony Wells, Snohomish, WA (US); Gregoire Guetat, Bellevue, WA (US); Gregory Christopher Johnson, Redmond, WA (US); Uday Hegde, Bellevue, WA (US); Richard Hill, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 178 days.

(21) Appl. No.: 13/357,045

(22) Filed: Jan. 24, 2012

(65) Prior Publication Data
US 2013/0191828 A1   Jul. 25, 2013

(51) Int. Cl.
*G06F 9/455* (2006.01)

(52) U.S. Cl.
USPC ............. 718/1; 707/610; 709/224; 726/4; 726/6; 717/171

(58) Field of Classification Search
USPC ............. 707/204, 610; 709/224–225, 249; 714/48; 717/171; 718/1; 719/312; 726/6
See application file for complete search history.

(56) References Cited

U.S. PATENT DOCUMENTS

| | | | | |
|---|---|---|---|---|
| 5,708,812 | A * | 1/1998 | Van Dyke et al. | 717/171 |
| 6,317,754 | B1 * | 11/2001 | Peng | 707/610 |
| 6,751,674 | B1 * | 6/2004 | Satagopan et al. | 709/249 |
| 6,848,106 | B1 * | 1/2005 | Hipp | 719/312 |
| 7,278,065 | B2 * | 10/2007 | Conkel | 714/48 |
| 2007/0168500 | A1 * | 7/2007 | D'Souza et al. | 709/224 |
| 2009/0006619 | A1 * | 1/2009 | Mohammed et al. | 709/225 |
| 2009/0199177 | A1 | 8/2009 | Edwards et al. | |
| 2009/0222498 | A1 * | 9/2009 | Lu et al. | 707/204 |
| 2009/0300605 | A1 * | 12/2009 | Edwards et al. | 718/1 |
| 2010/0280996 | A1 | 11/2010 | Gross, IV et al. | |
| 2011/0191834 | A1 * | 8/2011 | Singh et al. | 726/6 |

OTHER PUBLICATIONS

"Virtualizing Existing Domain Controllers", Retrieved on: Sep. 19, 2011, Available at: http://kb.vmware.com/selfservice/microsites/search.do?language=en_US&cmd=displayKC&externalId=1006996.
"Things to Consider When You Host Active Directory Domain Controllers in Virtual Hosting Environments", Published on: Sep. 10, 2011, Available at: http://support.microsoft.com/kb/888794.
Petri, Daniel, "Domain Controller Virtualization Options", Published on: Dec. 31, 2008, Available at: http://www.petri.co.il/domain-controller-virtualization-options.htm.

* cited by examiner

*Primary Examiner* — Lewis A Bullock, Jr.
*Assistant Examiner* — Gilles Kepnang
(74) *Attorney, Agent, or Firm* — Ben Tabor; David Andrews; Micky Minhas

(57) ABSTRACT

The present invention extends to methods, systems, and computer program products for domain controller safety-features and cloning. Embodiments include cloning virtual domain controllers. Cloning permits virtual domain controllers to be rapidly deployed by copying/cloning the entire operating system state of an existing virtual domain controller. Other embodiments provide safety features protecting domain controllers running within virtual machines from introducing distributed corruption into a directory services data system. Protection is facilitated by detecting when a hypervisor or Virtual Machine Manager ("VMM") uses features that cause a virtual machine to be rolled back in time outside of an operating system's awareness. In response to detecting a feature that causes rollback, safeties can be implemented to compensate for otherwise divergent state and prevent the introduction of duplicate unique identifiers.

15 Claims, 13 Drawing Sheets

DOMAIN CONTROLLER SAFETY-FEATURES AND CLONING

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

Many networks include domain controllers that manage directory service information for network administration and security. Domain controllers are responsible for authenticating and authorizing all users and computers within a network, assigning and enforcing security polices for all computers in a network, and installing or updating software on network computers. For example, a domain controller responds to security authentication requests (e.g., logging in, checking permissions, etc.) from other computer systems in a common domain. The domain controller can compare received security information to directory service information (e.g. a password) when determining how to respond to requests.

Domain controllers can use designated protocols to replicate directory services information to one another such that all domain controllers within a domain have an eventually consistent view of the directory services information. Thus, when a change to directory services information occurs at one domain controller, the change can be replicated to directory services information at other domain controllers in the domain or network. For networks with a relatively small number of users and computer systems, fewer domain controllers, and possibly even a single domain controller, can be used. For networks with larger numbers of users and computer systems, tens, hundreds or even thousands of domain controllers can be used.

Thus, from time to time, such as, for example, when the number of users and/or computer systems on a network or domain increases, it may desirable to add additional domain controllers to the network or domain. However, the process of adding a domain controller typically requires extensive and skilled administrator actions. These actions can include operating system installation, Internet Protocol ("IP") configuration, media preparations, and domain controller promotion.

Virtualization is the creation of a virtual (rather than actual) version of something, such as, for example, a hardware platform, operating system, or storage device. In a variety of computing environments, virtualization can be used to cut costs and simplify management. For example, through virtualization, fewer physical machines can be used requiring less space and power. Virtualization can also reduce deployment and management complexity, provide redundancy, and provide dynamic-scale capabilities. In virtualized environments, a hypervisor or (virtual machine manager ("VMM")) manages resources to enable multiple virtual machines, operating systems, to run concurrently on host hardware.

Accordingly, virtualization can include virtualizing domain controllers. Since domain controllers typically store security related information, various best-practices are often followed to mitigate against introducing inconsistencies between domain controllers or otherwise disrupting directory services information. Unfortunately, a hypervisor administrator is not necessarily aware of these best-practices (or even aware of basic requirements) for managing and/or replicating directory services information. As such, a hypervisor administrator may allow activities to occur (e.g., applying a snapshot to rollback a domain controller an earlier point in time) that disrupt directory services or introduce inconsistencies into directory services information at different domain controllers.

For example, a hypervisor may be used in such a way that it causes directory data that should be replicated to or from another domain controller to appear as though it already has been replicated, leaving the respective domain controllers in a permanently divergent state. Divergent state can cause lingering objects, inconsistent passwords, inconsistent attributes values, and schema mismatches at and/or between domain controllers. There is also some chance that security principals are created with duplicate IDs resulting in unauthorized access and ultimately failure to logon.

BRIEF SUMMARY

The present invention extends to methods, systems, and computer program products for domain controller safety-features and cloning. In some embodiments, a domain controller is cloned. A source domain controller is selected for cloning. A copy of the virtual hard drive for the source domain controller is obtained, and attached to another virtual machine. The cloned domain controller detects that its virtual machine generation ID has changed, and in response temporarily disables domain controller functionality and looks for domain controller clone configuration. The domain controller clone configuration is for configuring the cloned domain controller to appropriately interact with a network.

The cloned domain controller infers that it is being cloned by detecting the change in the virtual machine generation ID and by detecting the presence of the domain controller clone configuration. The cloned domain controller verifies with another (e.g., a primary or other agreed upon) domain controller that the source domain controller is authorized to be cloned. The cloned domain controller utilizes the domain controller clone configuration to configure appropriate interaction with the network.

In other embodiments, consistency is maintained when a domain controller is rolled back. A snapshot of the state of a source domain controller is created (e.g., by a hypervisor or hypervisor administrator) at a first logical time. The source domain controller has an initial invocation ID, a saved virtual machine generation ID, and a current virtual machine generation machine ID. The saved virtual machine generation ID and the current virtual machine generation ID are consistent at the first logical time. At a second logical time, the source domain controller writes first data to change its state. Also at the second logical time, the source domain controller, serving as the exclusive source of the first data, sends the first data along with the initial invocation ID to a target domain controller. Accordingly, the target domain controller can apply state changes consistent with the state changes at the source domain controller.

The target domain controller receives first data and an initial invocation ID from a source domain controller. The target domain controller maintains a first version of state from the source domain controller by writing the data to change its own state.

At a third logical time, the snapshot is applied to roll back the state of the source domain controller to the first logical time. The current virtual machine generation ID for the source domain controller is changed (e.g., by the hypervisor) in response to applying the snapshot. Subsequent to the snapshot being applied and subsequent to the first logical time, the source domain controller receives second data that, when written, further changes its state. Prior to writing the second data, the source domain controller detects that the saved virtual machine generation ID and the current virtual machine generation ID are inconsistent.

In response to detecting that the saved virtual machine generation ID and the current virtual machine generation ID are inconsistent, the source domain controller updates its invocation ID to a (new) subsequent invocation ID. The subsequent invocation ID differs from the initial invocation ID (and can be unique within the domain and possibly also globally unique). The source domain controller copies the current virtual machine generation ID to the saved virtual machine generation ID. At a fourth logical time after the first logical time, the source domain controller writes the second data to the source domain controller to further change the state of the source domain controller. Also at the fourth logical time, the source domain controller sends the second data along with the subsequent invocation ID to the target domain controller.

The target domain controller receives the second data and the subsequent invocation ID from the source domain controller. The target domain controller maintains a separate second version of state from the source domain controller along with the first version of state from the source domain controller by writing the second data to change the state at the target domain controller. The second data is written without violating the consistency of the state changes in the maintained first version of state from the source domain controller.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
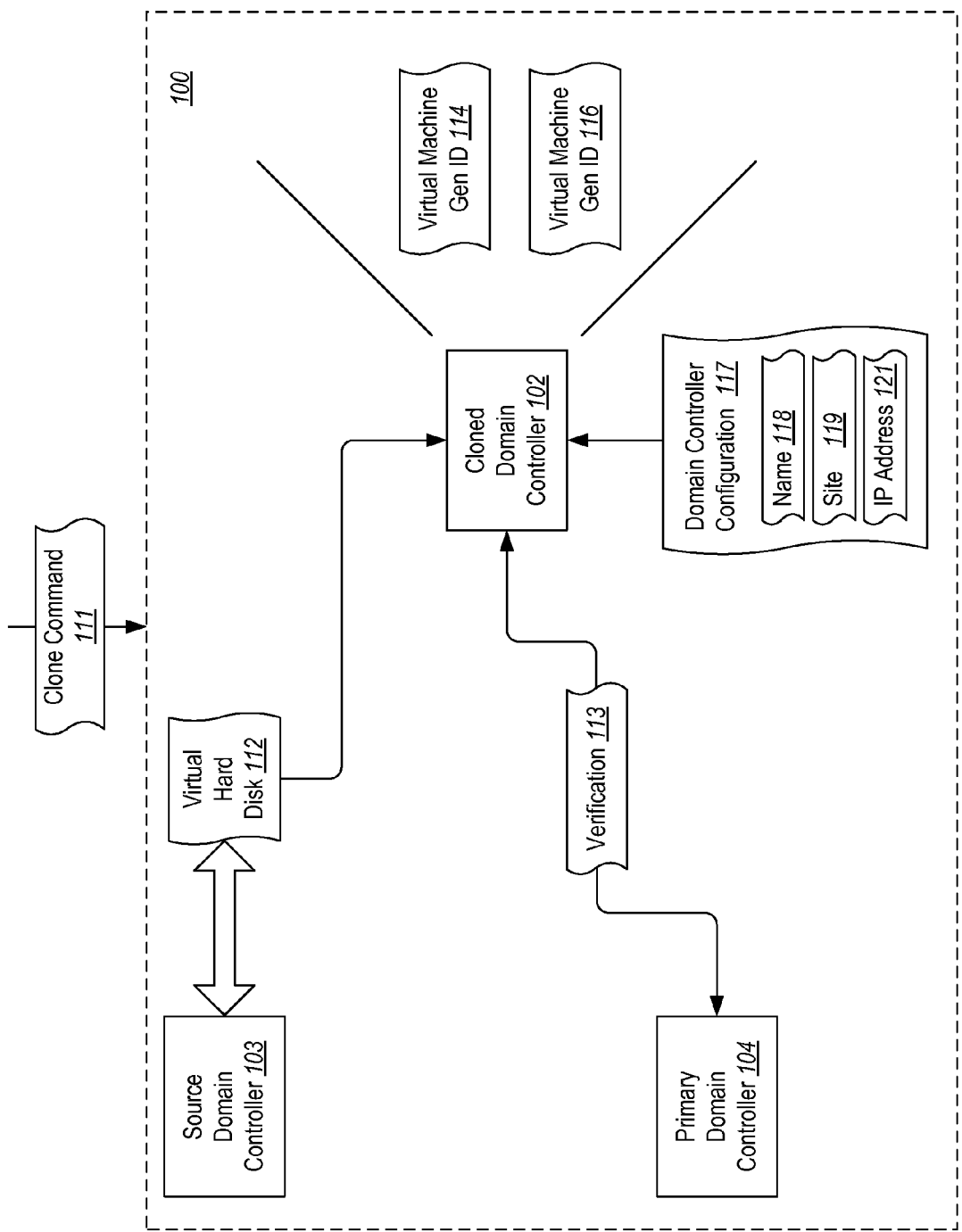
FIG. 1 illustrates an example virtualization environment that facilitates cloning a domain controller.

The present invention extends to methods, systems, and computer program products for domain controller safety-features and cloning. In some embodiments, a domain controller is cloned. A source domain controller is selected for cloning. A copy of the virtual hard drive for the source domain controller is obtained, and attached to another virtual machine. The cloned domain controller detects that its virtual machine generation ID has changed, and in response temporarily disables domain controller functionality and looks for domain controller clone configuration. The domain controller clone configuration is for configuring the cloned domain controller to appropriately interact with a network.

The cloned domain controller infers that it is being cloned by detecting the change in the virtual machine generation ID and by detecting the presence of the domain controller clone configuration. The cloned domain controller verifies with another (e.g., a primary or other agreed upon) domain controller that the source domain controller is authorized to be cloned. The cloned domain controller utilizes the domain controller clone configuration to configure appropriate interaction with the network.

In other embodiments, consistency is maintained when a domain controller is rolled back. A snapshot of the state of a source domain controller is created at a first logical time. The source domain controller has an initial invocation ID, a saved virtual machine generation ID, and a current virtual machine generation machine ID. The saved virtual machine generation ID and the current virtual machine generation ID are consistent at the first logical time. At a second logical time, the source domain controller writes first data to change its state. Also at the second logical time, the source domain controller, serving as the exclusive source of the first data, sends the first data along with the initial invocation ID to a target domain controller. Accordingly, the target domain controller can apply state changes consistent with the state changes at the source domain controller.

The target domain controller receives first data and an initial invocation ID from a source domain controller. The target domain controller maintains a first version of state from the source domain controller by writing the data to change its own state and the invocation ID.

At a third logical time, the snapshot is applied to roll back the state of the source domain controller to the first logical time. The current virtual machine generation ID for the source domain controller is changed in response to applying the snapshot. Subsequent to the snapshot being applied and subsequent to the first logical time, the source domain controller receives second data that, when written, further changes its state. Prior to writing the second data, the source domain controller detects that the saved virtual machine generation ID and the current virtual machine generation ID are inconsistent.

In response to detecting that the saved virtual machine generation ID and the current virtual machine generation ID are inconsistent, the source domain controller updates its invocation ID to a (new) subsequent invocation ID. The subsequent invocation ID differs from the initial invocation ID (and can be globally unique). The source domain controller copies the current virtual machine generation ID to the saved virtual machine generation ID. At a fourth logical time after the first logical time, the source domain controller writes the second data to the source domain controller to further change the state of the source domain controller. Also at the fourth logical time, the source domain controller sends the second data along with the subsequent invocation ID to the target domain controller.

The target domain controller receives the second data and the subsequent invocation ID from the source domain controller. The target domain controller maintains a separate second version of state from the source domain controller along with the first version of state from the source domain controller by writing the second data to change the state at the target domain controller. The second data is written without violating the consistency of the state changes in the maintained first version of state from the source domain controller.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention include cloning virtual domain controllers. Cloning permits virtual domain controllers to be rapidly deployed by copying/cloning the entire operating system state of an existing virtual domain controller. For example, an administrator can simply shutdown and copy an existing virtual domain controller's virtual disks, deploy the copied virtual disks to a new virtual machine, create a simple or empty configuration file and power on the new virtual machine.

Other embodiments of the invention provide safety features protecting domain controllers running within virtual machines from introducing distributed corruption into a directory services data system. Protection is facilitated by detecting when a hypervisor or Virtual Machine Manager ("VMM") uses features that cause a virtual machine to be rolled back in time outside of an operating system's awareness. In response to detecting a feature that causes rollback, safeties can be implemented to compensate for otherwise divergent state and prevent the introduction of duplicate unique identifiers.

FIG. 1 illustrates an example virtualization environment 100 that facilitates cloning a domain controller. Referring to FIG. 1, virtualization environment 100 includes cloned domain controller 102, source domain controller 103, and primary domain controller 104. Each of the depicted domain controllers is connected to one another over (or is part of) a network, such as, for example, a Local Area Network ("LAN"), a Wide Area Network ("WAN"), and even the Internet. Accordingly, each of the depicted computer systems as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), etc.) over the network.

Cloned domain controller 102, source domain controller 103, and primary domain controller 104 can be virtualized domain controllers that store directory services information for virtualization environment 100. An administrator for virtualization environment 100 can send commands to components in virtualization environment 100 using an external program, such as, for example, a hypervisor or VMM. For example, an administrator can enter commands (including clone command 111) for deploying a new domain controller by cloning.

The domain administrator can select a (source) domain controller that is to be cloned (e.g., source domain controller 103). The domain administrator gives appropriate permission to the (source) domain controller for it to be cloned. The administrator can then make a clone of the (source) domain controller. For example, the administrator can send clone command 111 to virtualization environment 100.

Figure 2:
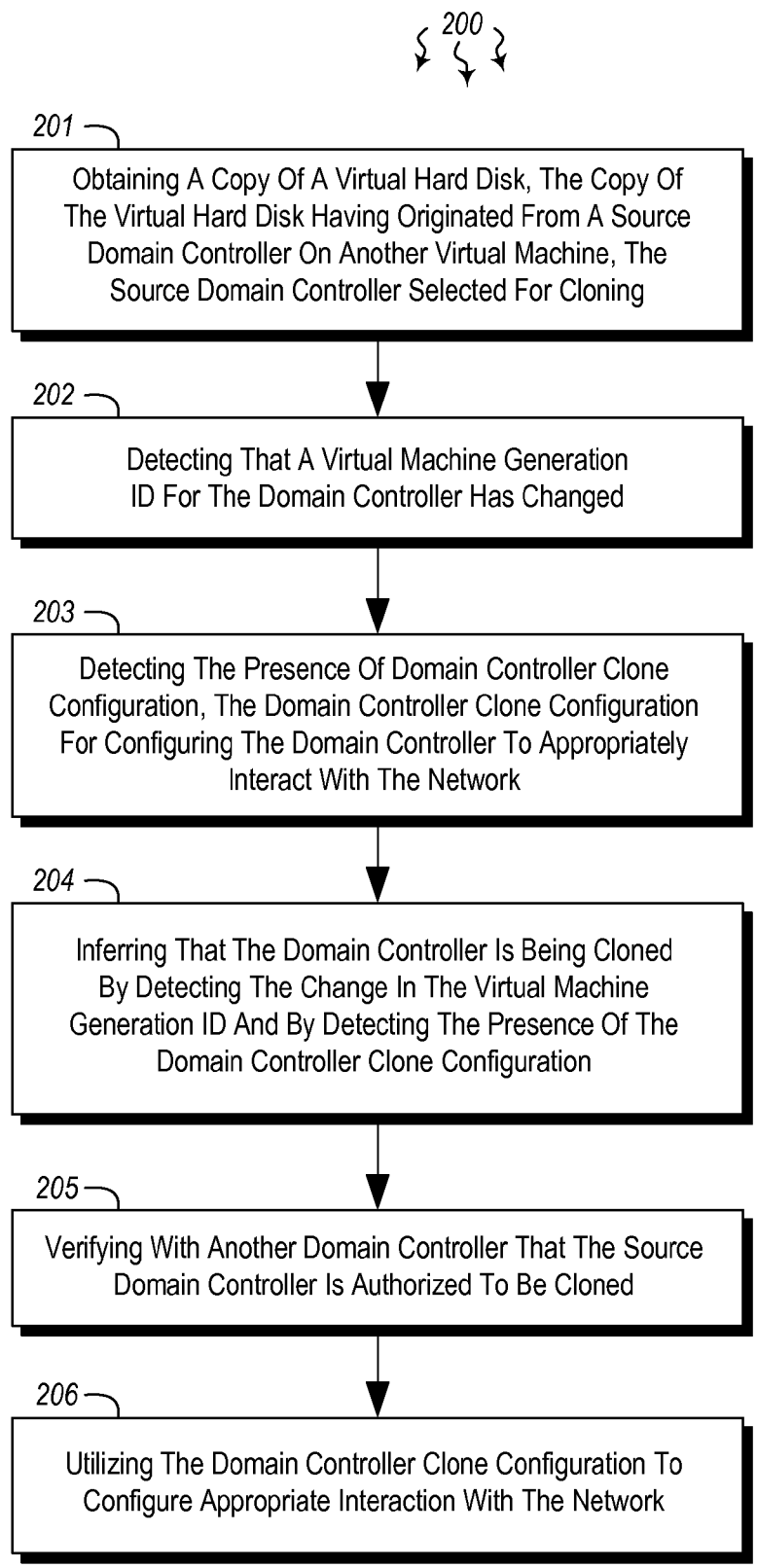
FIG. 2 illustrates a flow chart of an example method for cloning a domain controller.

FIG. 2 illustrates a flow chart of an example method 200 for cloning a domain controller. Method 200 will be described with respect to the components and data of virtualization environment 100.

Method 200 includes an act of obtaining a copy of a virtual hard disk, the copy of the virtual hard disk having originated from a source domain controller on another virtual machine, the source domain controller selected for cloning (act 201). For example, an administrator (such as a hypervisor administrator) or a hypervisor (through automated operation) can select source domain controller 103 for cloning and send clone command 111 to virtualization environment 100. In response to clone command 111, cloned domain controller 102 can obtain a copy of virtual hard disk 112. Virtual hard disk 112 can have originated from source domain controller 103 on another virtual machine within virtualization environment 100. In a hypervisor or VMM, cloning can be facilitated by exporting a snapshot or exporting a Virtual Machine ("VM") and then importing it using a 'copy' option.

Method 200 includes an act of the domain controller detecting that a virtual machine generation ID for the domain controller has changed (act 202). For example, virtualization environment 100 can maintain a unique virtual machine generation ID for each VM. Prior to receiving virtual hard disk 112, the VM that cloned domain controller 102 is to run on can have virtual machine gen ID 114. After copying virtual hard disk 112 to the VM, virtualization environment 100 can assign virtual machine gen ID 116 to the VM.

An administrator can then start the VM (whose virtual machine generation ID is 116) to implement cloned domain controller 103. Upon starting, cloned domain controller 102 detects that it may be a clone by detecting that virtual machine gen ID 116 differs from virtual machine gen ID 114. Starting a VM can include rebooting or resuming. In response to detecting the change in virtual machine generation IDs, domain controller 102 can disable domain controller functionality and look for domain controller clone configuration.

Method 200 includes an act of the domain controller detecting the presence of domain controller clone configuration, the domain controller clone configuration for configuring the domain controller to appropriately interact with (e.g., other machines on) the network (act 203). For example, cloned domain controller 102 can detect the presence of domain controller configuration 117 (e.g., an XML file, a local database, in the registry, etc.). Domain controller configuration 117 can include information, such as, for example, name 118, site 119, and IP address 121. Domain controller configuration 117 is for configuring cloned domain controller 102 to appropriately interact with virtualization environment 100 as well as other machines, (e.g., source domain controller 103, primary domain controller 104, and any other domain controllers) in virtualization environment 100. Other data in domain controller configuration 117 can include additional TCP/IP configuration such as subnet masks, gateway, and preferred DNS values.

Method 200 includes an act of the domain controller inferring that the domain controller is being cloned by detecting the change in the virtual machine generation ID and by detecting the presence of the domain controller clone configuration (act 204). For example, cloned domain controller 102 can infer it is being cloned by detecting the difference between virtual machine gen ID 116 and virtual machine gen ID 114 and by detecting the presence of domain controller configuration 117.

Method 200 includes an act of the domain controller verifying with another domain controller that the source domain controller is authorized to be cloned (act 205). For example, cloned domain controller 102 can implement verification 113 with primary domain controller 104 (or some other agreed upon domain controller) to verify that source domain controller 103 is authorized to be cloned. In some embodiments, cloning can be gated upon source domain controller 103 having a cloning-safe set of applications, scheduled tasks and services installed, that is, for example, determined through a whitelist. Primary domain controller 104 can verify a whitelist with source domain controller 103 prior to authorizing cloning.

Method 200 includes an act of the domain controller utilizing information included in the domain controller clone configuration to configure appropriate interaction with (e.g., the other machines on) the network (act 206). For example, cloned domain controller 102 can utilize domain controller configuration 117, including name 118, site 119, and IP address 121, to configure appropriate interaction with virtualization environment 100. Appropriate interaction with virtualization environment 100 can include appropriate interaction with other machines in virtualization environment 100, including primary domain controller 104 and source domain controller 103.

Cloned domain controller 103 can use domain controller configuration 117 to at least partially transition from an identical copy (clone) of source domain controller 103 to a unique, additional domain controller. Cloned domain controller 102 can also generate a new invocation ID to distinguish itself from source domain controller 103. After configuration, cloned domain controller 102 can be essentially the same as a domain controller that was installed and promoted as a normal replica controller.

In some embodiments, cloned domain controller 102 contacts primary domain controller 104 using the credentials of source domain controller 103, and creates a new domain controller security context and domain controller slots by duplicating information from source domain controller 103 security context and slots. If set, cloned domain controller 102 passes name 118 and site 119 in as parameters. Alternately, primary domain controller 104 assigns a name and the site is the same as source domain controller 103. Primary domain controller 104 can also assign a random password for the cloned domain controller 103 account. Primary domain controller 104 can return the name and password of the cloned domain controller 102.

Cloned domain controller 102 can then change the local Directory Information Tree ("DIT") and local machine to use the new identity. Cloned domain controller 102 can also use DNS, DHCP, Licensing, and File Replication Service ("FRS") services as appropriate to have equivalent configuration to a domain controller promoted via standard mechanisms and use the new identity. Primary domain controller 104 renames cloned domain controller 102 to the new name (e.g., name 118) and sets the password for cloned domain controller 102 locally. Cloned domain controller 102 is then rebooted. Through a reboot, domain controller 102 can assume the new identity and re-enable any domain functionality that was previously disabled.

Figure 3:
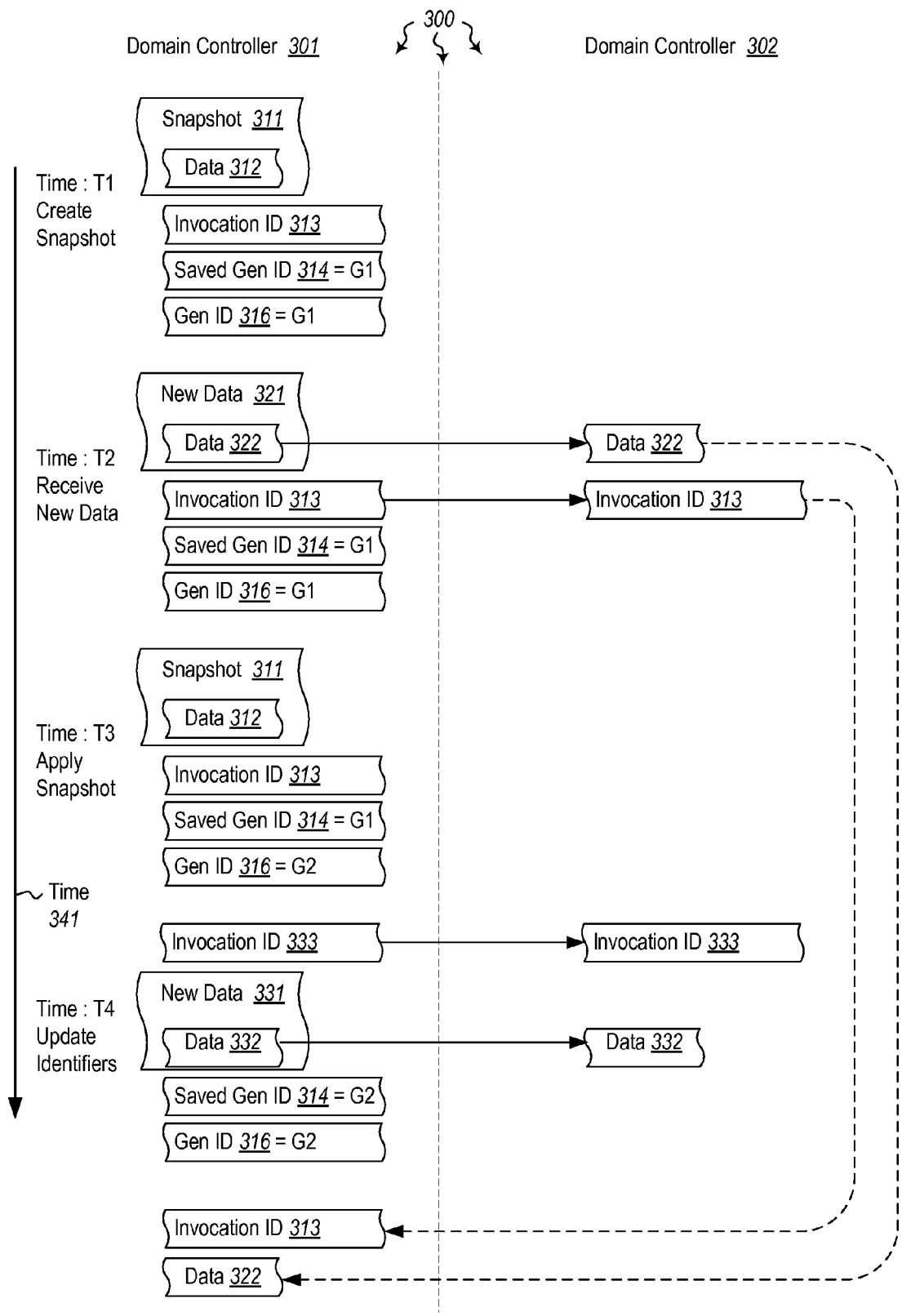
FIG. 3 illustrates an example virtualization environment that facilitates maintaining consistency when a domain controller is rolled back.

FIG. 3 illustrates an example virtualization environment 300 that facilitates maintaining consistency when a domain controller is rolled back. As depicted in virtualization environment 300, snapshot 311 is taken at domain controller 301 logical time T1. Snapshot 311 is then applied at domain controller 301 at logical time T3 to rollback domain controller 301. FIGS. 4A-4D illustrate a flow chart of an example method 400 for maintaining consistency when a domain controller is rolled back. Method 400 will be described with respect to the components and data of virtualization environment 300.

Figure 4A:
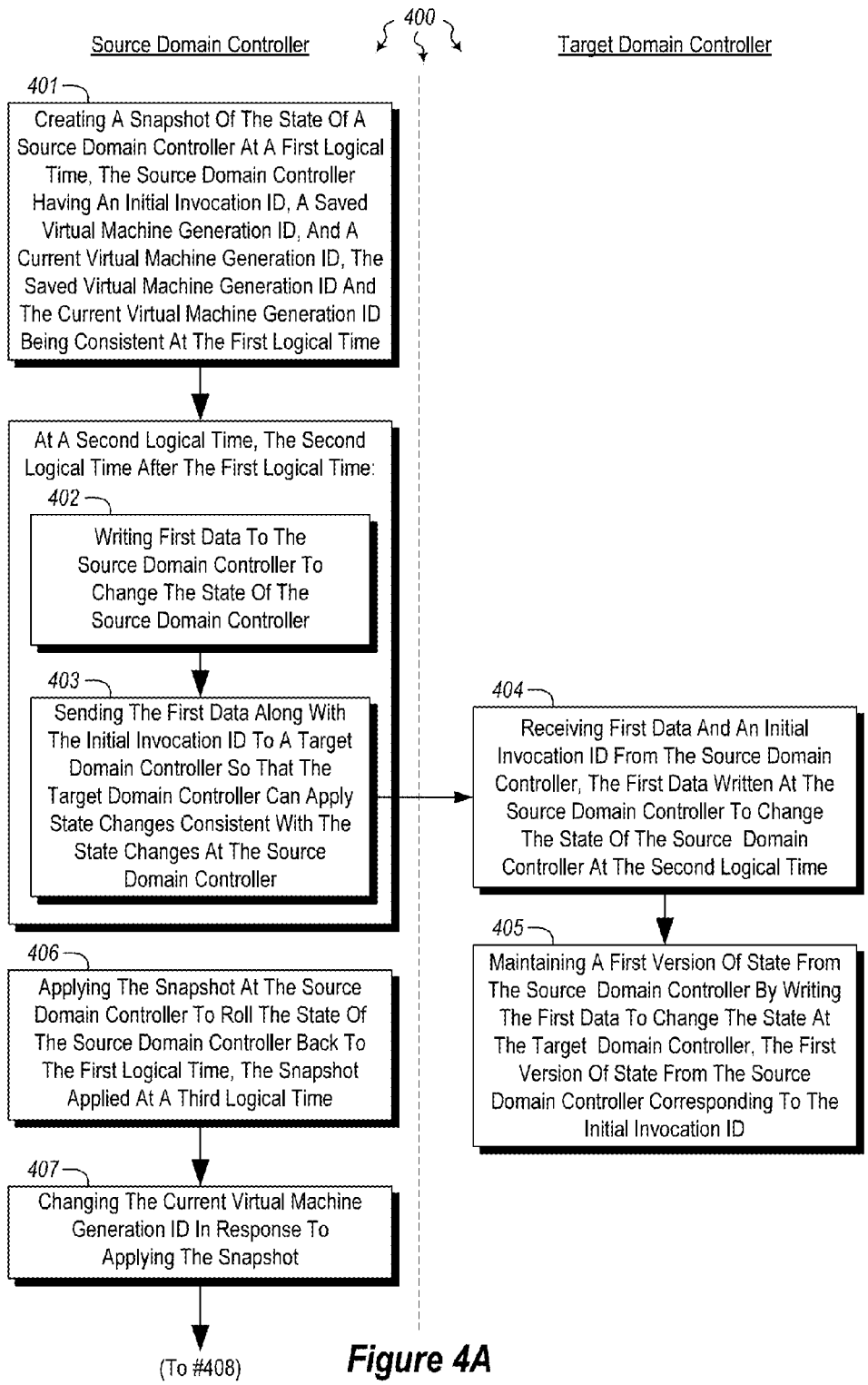
FIGS. 4A-4D illustrate a flow chart of an example method for maintaining consistency when a domain controller is rolled back.

Method 400 includes an act of creating a snapshot of the state of a source domain controller at a first logical time, the source domain controller having an initial invocation ID, a saved virtual machine generation ID, and a current virtual machine generation ID, the saved virtual machine generation ID and the current virtual machine generation ID being consistent at the first logical time (act 401, FIG. 4A). For example, an administrator (such as a hypervisor administrator) or a hypervisor (through automated operation) can take snapshot 311 of domain controller 301 at time T1. At time T1, Domain controller 301 can have invocation ID 313, saved gen ID 314=G1, and gen ID 316=G1. Saved gen ID 314 is stored and managed by domain controller 301. Gen ID 316 is stored and managed by the hypervisor. At time T1, saved gen ID 314 (managed by domain controller 301) and gen ID 316 (managed by the hypervisor) are consistent.

Invocation ID 313 can be used to uniquely identify domain controller 301 in replication protocol communications with other domain controllers. Thus, Invocation ID 313 can be unique among other domain controllers in the domain with domain controller 301. Invocation ID 313 can also be globally unique within virtualization environment 300. In some embodiments, invocation IDs are statistically unique among all other invocation IDs in virtualization environment 300.

Method 400 includes at a second logical time, the second logical time after the first logical time, an act of writing first data to the source domain controller to change the state of the source domain controller (act 402, FIG. 4A). For example, at time T2, domain controller 301 can receive new data 321 including data 322 (e.g., directory services data). Domain controller 301 can write data 322 to change its state.

Method 400 also includes at the second logical time, an act of sending the first data along with the initial invocation ID to a target domain controller so that the target domain controller can apply state changes consistent with the state changes at the source domain controller (act 403, FIG. 4A). For example, at time T2, domain controller 301 can send data 322 and invocation ID 313 to domain controller 302. Method 400 includes an act of receiving first data and an initial invocation ID from a source domain controller, the first data written at the source domain controller to change the state of the source domain controller at the second logical time (act 404, FIG. 4A). For example, domain controller 302 can receive data 322 and invocation ID 313 from domain controller 301. Data 322 can be used at domain controller 302 to apply state changes consistent with the state changes at domain controller 301.

Method 400 includes an act of maintaining a first version of state from the source domain controller by writing the first data to change the state at the target domain controller, the first version of state from the source domain controller corresponding to the initial invocation ID (act 405, FIG. 4A). For example, domain controller 302 can maintain a first version of state from domain controller 301 by writing data 322 to change the state at the target domain controller. The first version of state from the domain controller 301 corresponds to invocation ID 313.

Method 400 includes an act of applying the snapshot at the source domain controller to roll the state of the source domain controller back to the first logical time, the snapshot applied at a third logical time (act 406, FIG. 4A). For example, an administrator (such as a hypervisor administrator) or a hypervisor (through automated operation) can apply snapshot 311 at time T3 to rollback domain controller 301 to time T1. Method 400 includes an act of changing the current virtual machine generation ID in response to applying the snapshot (act 407, FIG. 4A). For example, the hypervisor can assign a value of G2 to Gen ID 316 (such that Gen ID 316=G2) in response to applying snapshot 311.

Figure 4B:
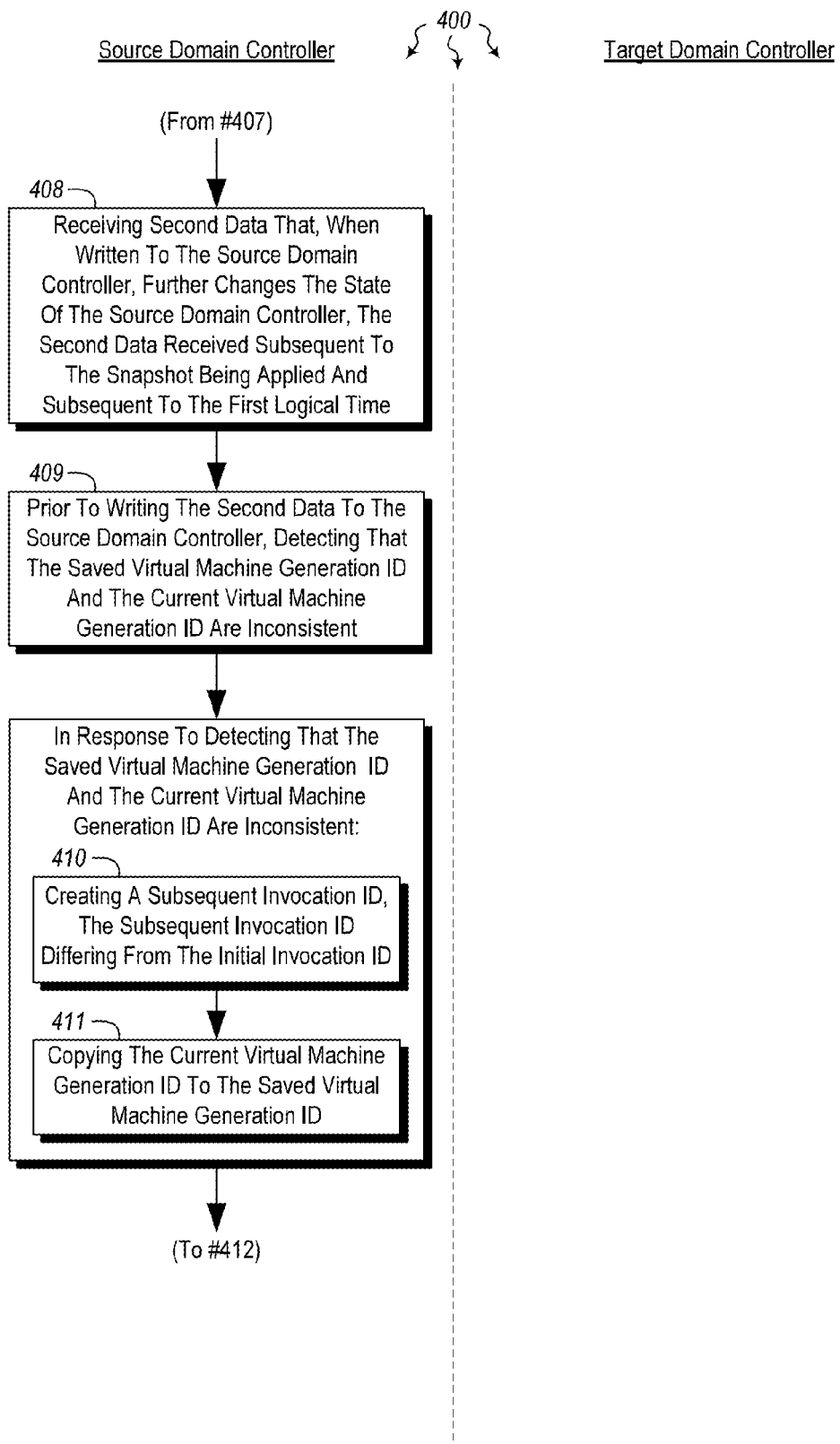

Method 400 includes an act of receiving second data that, when written to the source domain controller, further changes the state of the source domain controller, the second data received subsequent to the snapshot being applied and subsequent to the first logical time (act 408, FIG. 4B). For example, domain controller 301 can receive new data 331, including data 332 (e.g., directory services data), subsequent to snapshot 311 being applied at domain controller 301 and subsequent to time T1. When written, data 332 can further change the state of domain controller 301. Method 400 includes an act of prior to writing the second data to the source domain controller, an act of the source domain controller detecting that the saved virtual machine generation ID and the current virtual machine generation ID are inconsistent (act 409, FIG. 4B). For example, prior to writing data 332, domain controller 301 can detect that saved gen ID 314=G1 and gen ID 312=G2 are inconsistent.

Method 400 includes in response to detecting that the saved virtual machine generation ID and the current virtual machine generation ID are inconsistent, an act of creating a subsequent invocation ID, the subsequent invocation ID differing from the initial invocation ID (act 410, FIG. 4B). For example, in response to detecting that saved gen ID 314=G1 and gen ID 312=G2 are inconsistent, domain controller 301 can create invocation ID 333. Invocation ID 333 can differ from invocation ID 313. Invocation ID 333 can also be unique among other domain controllers in the domain with domain controller 301. Invocation ID 333 can also be globally unique within virtualization environment 300.

Other operations can also occur in response to detecting inconsistency between the virtual machine generation IDs. For example, domain controller 301 can discard the RID pool and refuse to serve as a Flexible Single Master of Operations ("FSMO") until a replication cycle is completed indicating that domain controller 301 is still a role owner.

Method 400 also includes in response to detecting that the saved virtual machine generation ID and the current virtual machine generation ID are inconsistent, an act of copying the current virtual machine generation ID to the saved virtual machine generation ID (act 411, FIG. 4B). For example, in response to detecting that saved gen ID 314=G1 and gen ID 312=G2 are inconsistent, domain controller 301 can copy the value of G2 to saved gen ID 314 such that saved gen ID 314=G2.

Figure 4C:
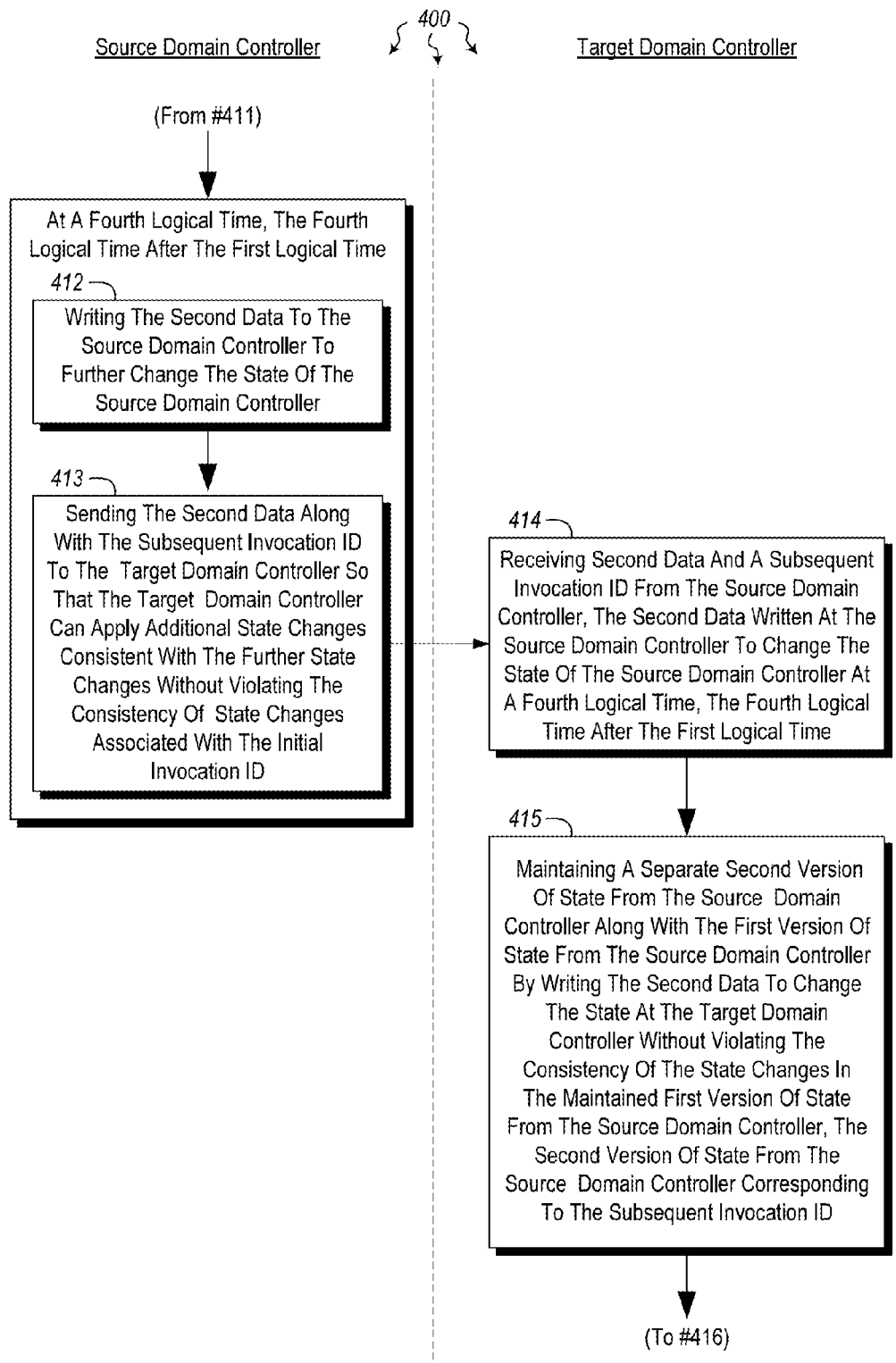

Method 400 includes at a fourth logical time, the fourth logical time after the first logical time, an act of writing the second data to the source domain controller to further change the state of the source domain controller (act 412, FIG. 4C). For example, at time T4, domain controller 301 can write data 332 to further change the state of domain controller 301. Time T4 can be after time T1 but not necessarily after time T2 and/or T3.

Method 400 also includes at the fourth logical time, an act of sending the second data along with the subsequent invocation ID to the target domain controller so that the target domain controller can apply additional state changes consistent with the further state changes without violating the consistency of state changes associated with the initial invocation ID (act 413, FIG. 4C). For example, at time T4, domain controller 301 can send data 332 along with invocation ID 333 to domain controller 302. Accordingly, domain controller 302 can apply additional state changes consistent with the further state changes at domain control 301 without violating the consistency of the state changes associated with invocation ID 313.

Method 400 includes an act of receiving second data and a subsequent invocation ID from the source domain controller, the second data written at the source domain controller to change the state of the source domain controller at the fourth logical time, the fourth logical time after the first logical time (act 414, FIG. 4C). For example, domain controller 302 can receive data 322 along with invocation ID 333 from domain controller 301.

Method 400 includes an act of maintaining a separate second version of state from the source domain controller along with the first version of state from the source domain controller by writing the second data to change the state at the target domain controller without violating the consistency of the state changes in the maintained first version of state from the source domain controller, the second version of state from the source domain controller corresponding to the subsequent invocation ID (act 415, FIG. 4C). For example, domain controller 302 can maintain a separate second version of state from domain controller 301 along with the first version of state from domain controller 301. The second separate version of state can be maintained by writing the second data to change the state at domain controller 302 without violating the consistency of the state changes in maintained first version of state from domain controller 301. The second separate version of state corresponds to invocation ID 333.

Figure 4D:
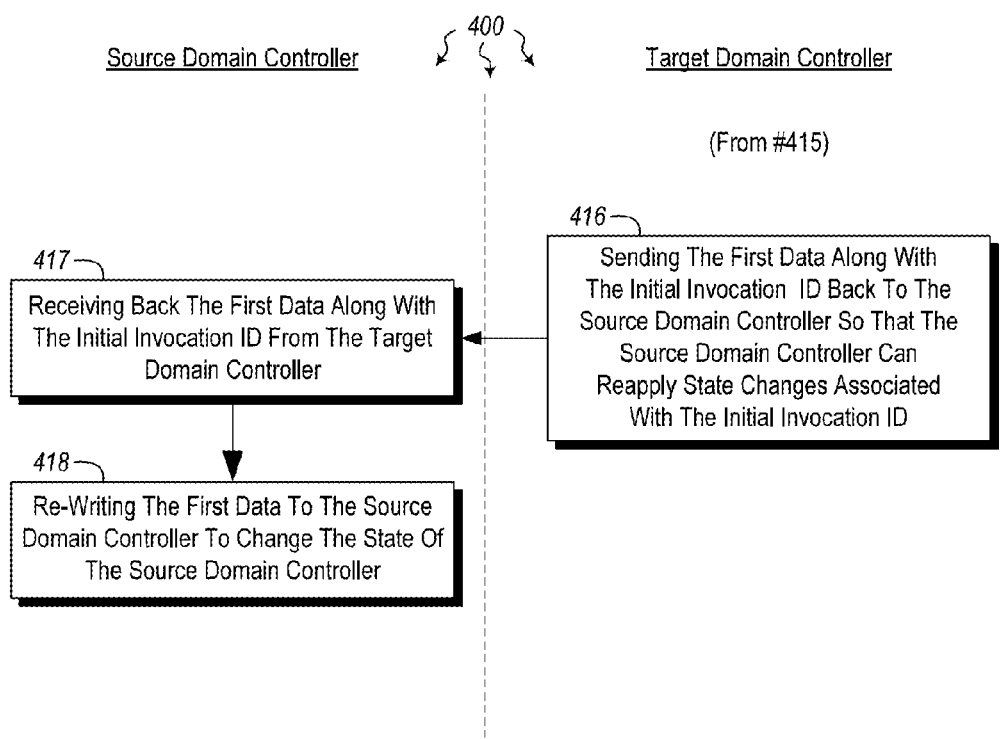

Method 400 includes an act of sending the first data along with the initial invocation ID back to the source domain controller so that the source domain controller can reapply state changes associated with the initial invocation ID (act 416, FIG. 4D). For example, domain controller 320 can send data 312 and invocation ID 313 back to domain controller 301. Thus, domain controller 301 can reapply state changes associated with invocation ID 313.

Method 400 includes an act of receiving back the first data along with the initial invocation ID from the target domain controller (act 417, FIG. 4D). For example, domain controller 302 can receive data 322 and invocation ID 313 from domain controller 301. Method 400 includes an act of re-writing the first data to the source domain controller to change the state of the source domain controller (act 418, FIG. 4D). For example, domain controller 301 can re-write data 322 to change the state of domain controller 301. Domain controller 301 can then maintain an updated version of state corresponding to invocation ID 313. Accordingly, both domain controller 301 and domain controller 302 have the same version of state for invocation ID 313 (the initial invocation ID).

Similar to domain controller 302, domain controller 301 can then also maintain two different versions of state. One version of state can correspond to invocation ID 313 and another version of state can correspond to invocation ID 333.

Figure 5A:
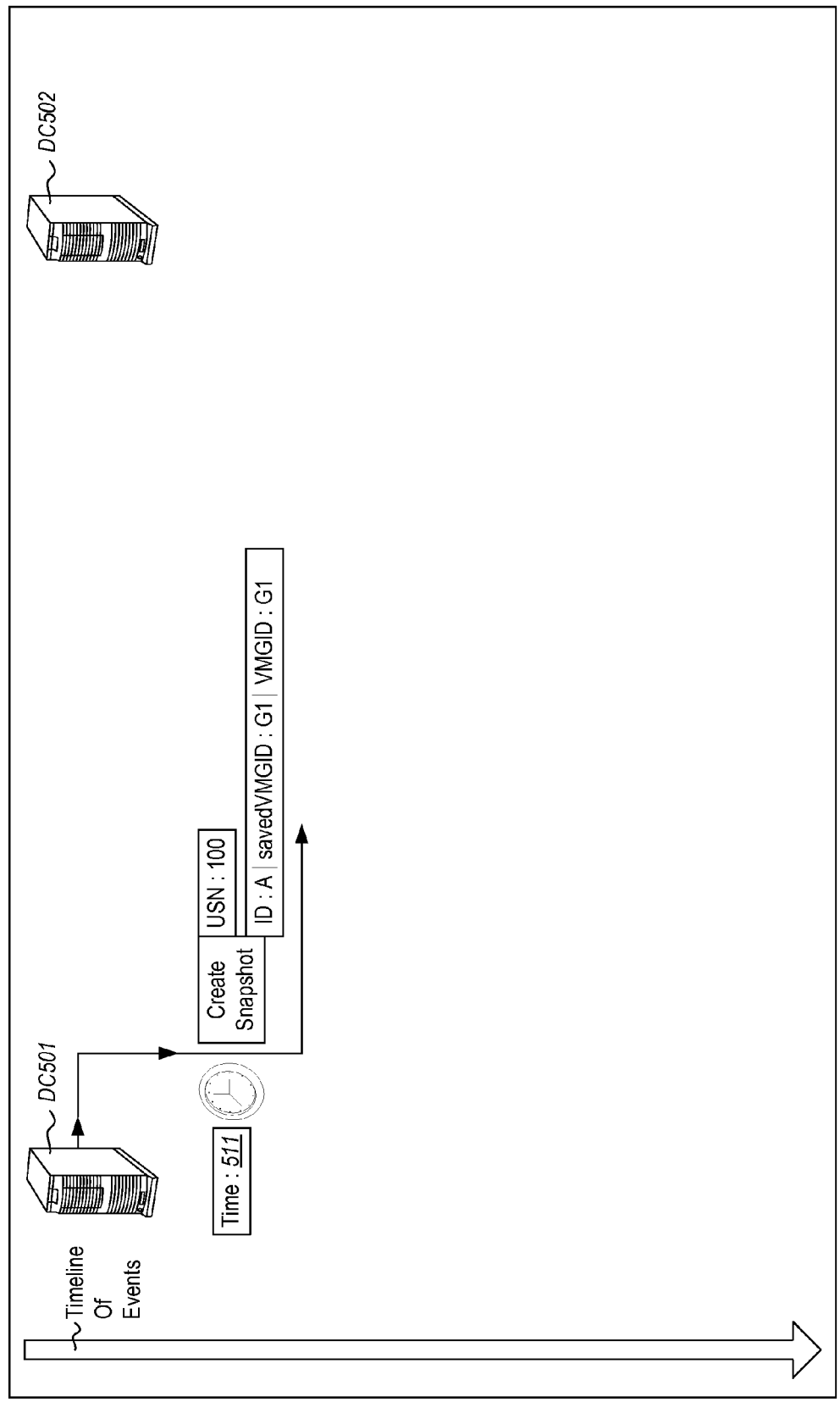
FIGS. 5A-5F illustrate a data flow for maintaining consistency when a domain controller is rolled back.

FIGS. 5A-5F illustrate a data flow for maintaining consistency when a domain controller is rolled back. The time line of events indicates the direction of time moving forward. FIG. 5A depicts domain controller 501 creating a snapshot at time 511. Prior to time 511, domain controller 501 and domain controller 502 are in sync with one another. The snap shot is of 100 Update Sequence Numbers ("USNs"). At the time of the snapshot, Update Sequence Number ("USN")=100, invocation ID=A, saved virtual machine generation ID=G1, and virtual machine generation ID=G1.

Figure 5B:
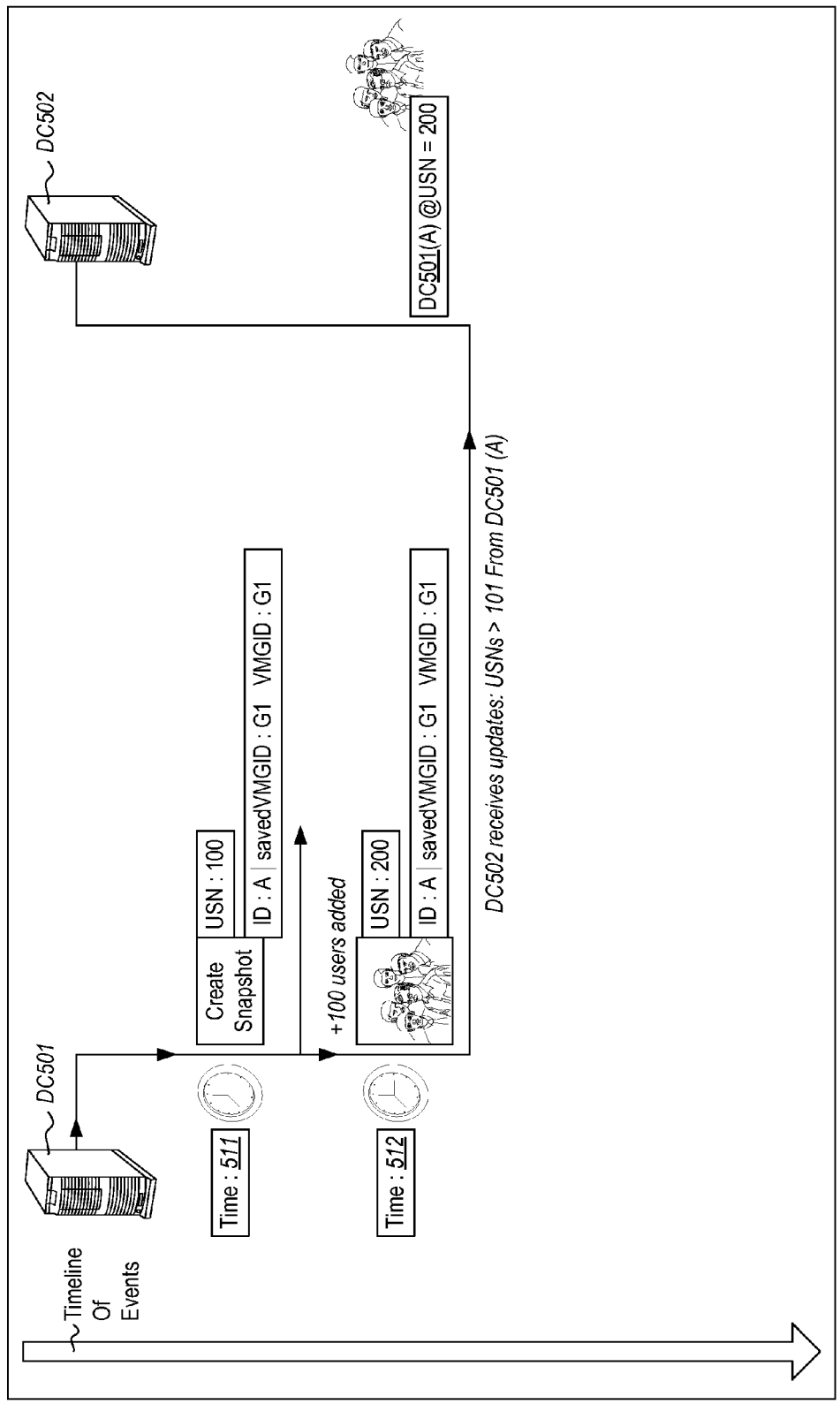

FIG. 5B depicts the addition of 100 users to domain controller 501 at time 512. Domain controller 501 sends USNs>=101 to domain controller 502. Domain controller 502 receives USNs>=101 from domain controller 501. Domain controller 502 saves data indicating that at domain controller 501 for invocation ID A, USN=200.

Figure 5C:
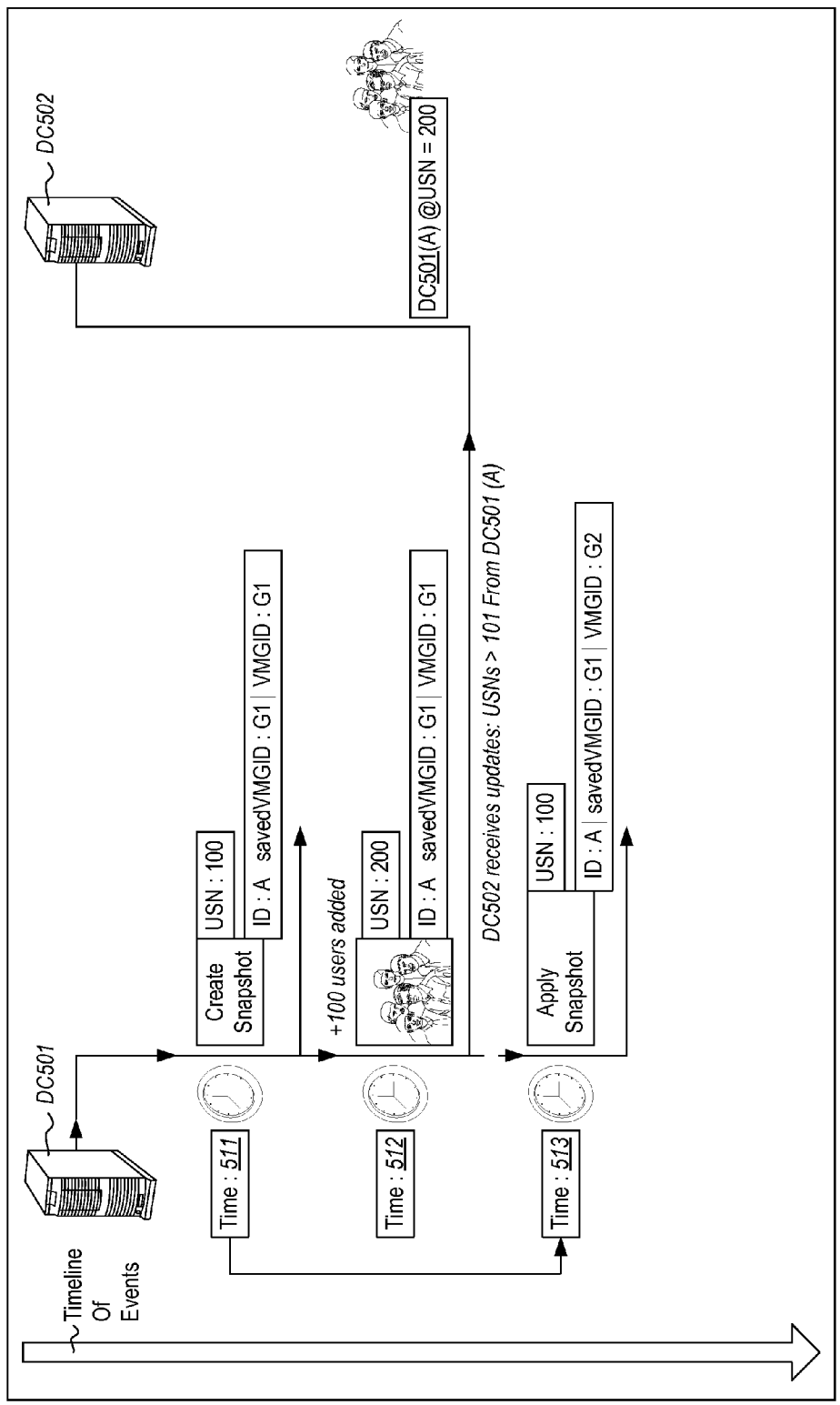

FIG. 5C depicts applying the snapshot created at time 511 at domain controller 501 at time 513. Application of the snapshot is detected and virtual machine generation ID is set equal to G2. Thus, at time 513, saved virtual machine generation ID and virtual machine generation ID differ. Domain controller 501 detects the difference between saved virtual machine generation ID and virtual machine generation ID and employs safeties to prevent divergent state and/or duplicate IDs.

Figure 5D:
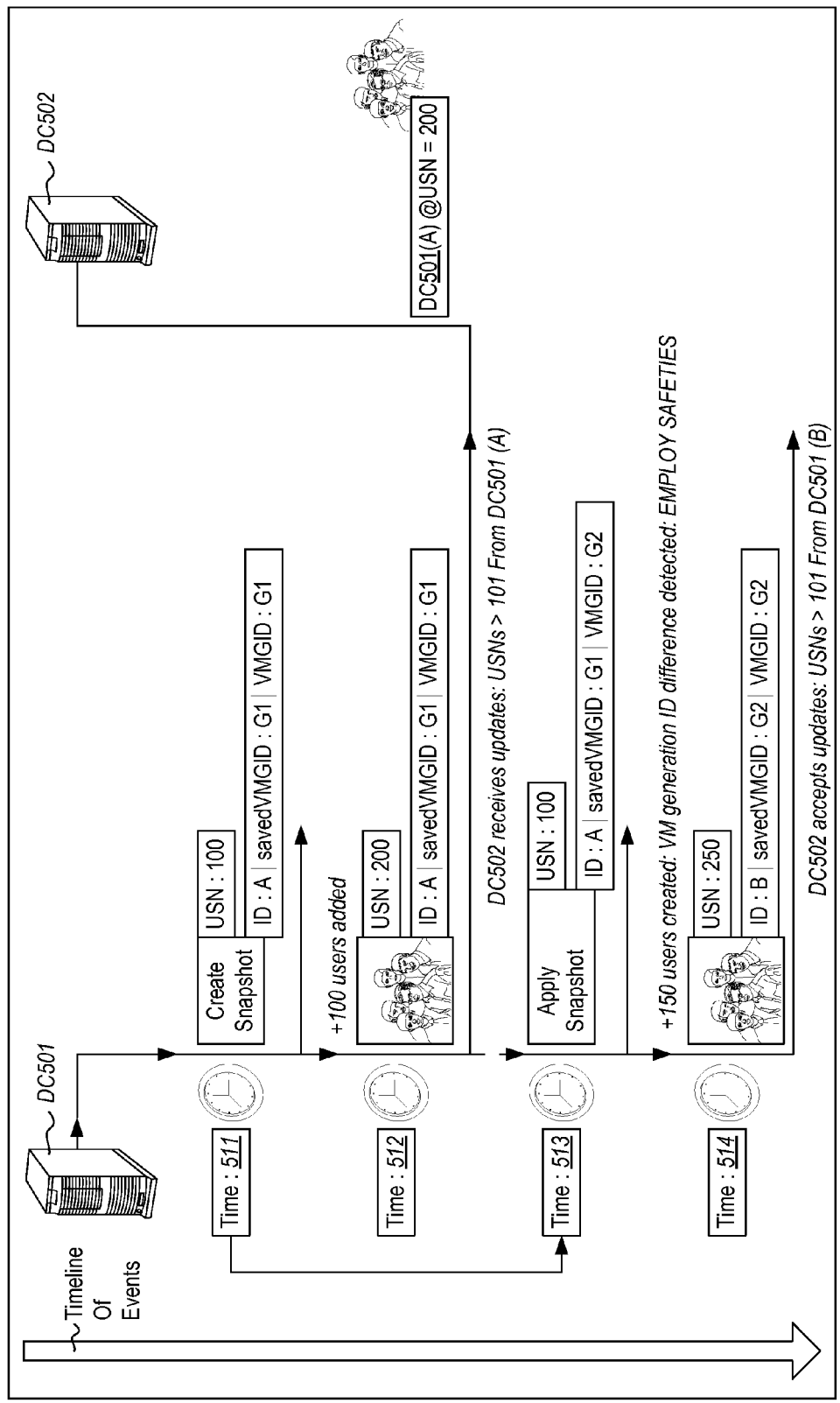

FIG. 5D depicts the addition of 150 users to domain controller 501 at time 514. Further since, saved virtual machine generation ID and virtual machine generation ID differ, domain controller 501 sets invocation ID to B. Domain controller 501 again sends USNs>=101 to domain controller 502. Domain controller 502 again accepts USNs>=101 from domain controller 501. The 150 users can be created and the data sent to domain controller 502 after the invocation ID of domain controller 501 changes from A to B.

Figure 5E:
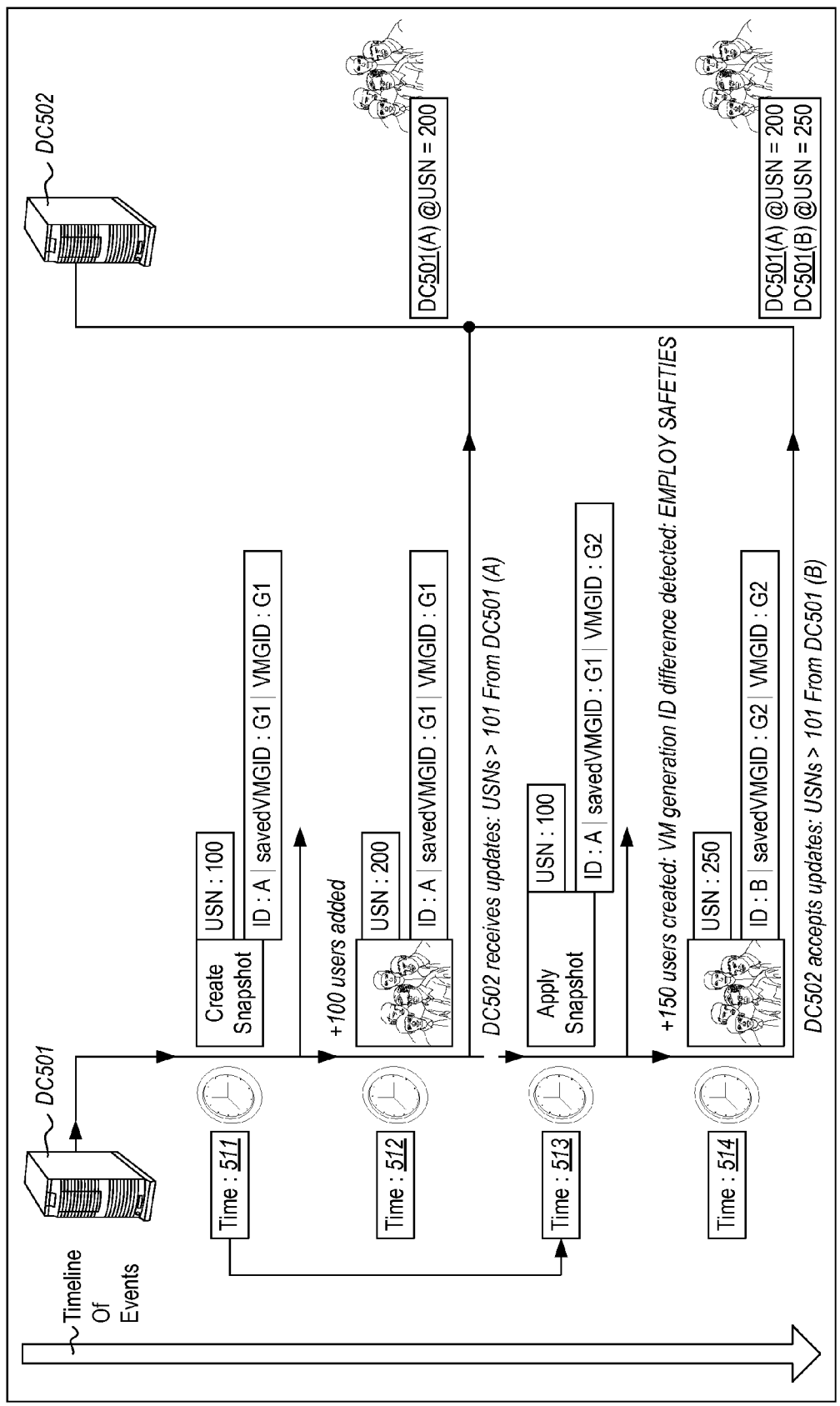
Figure 5F:
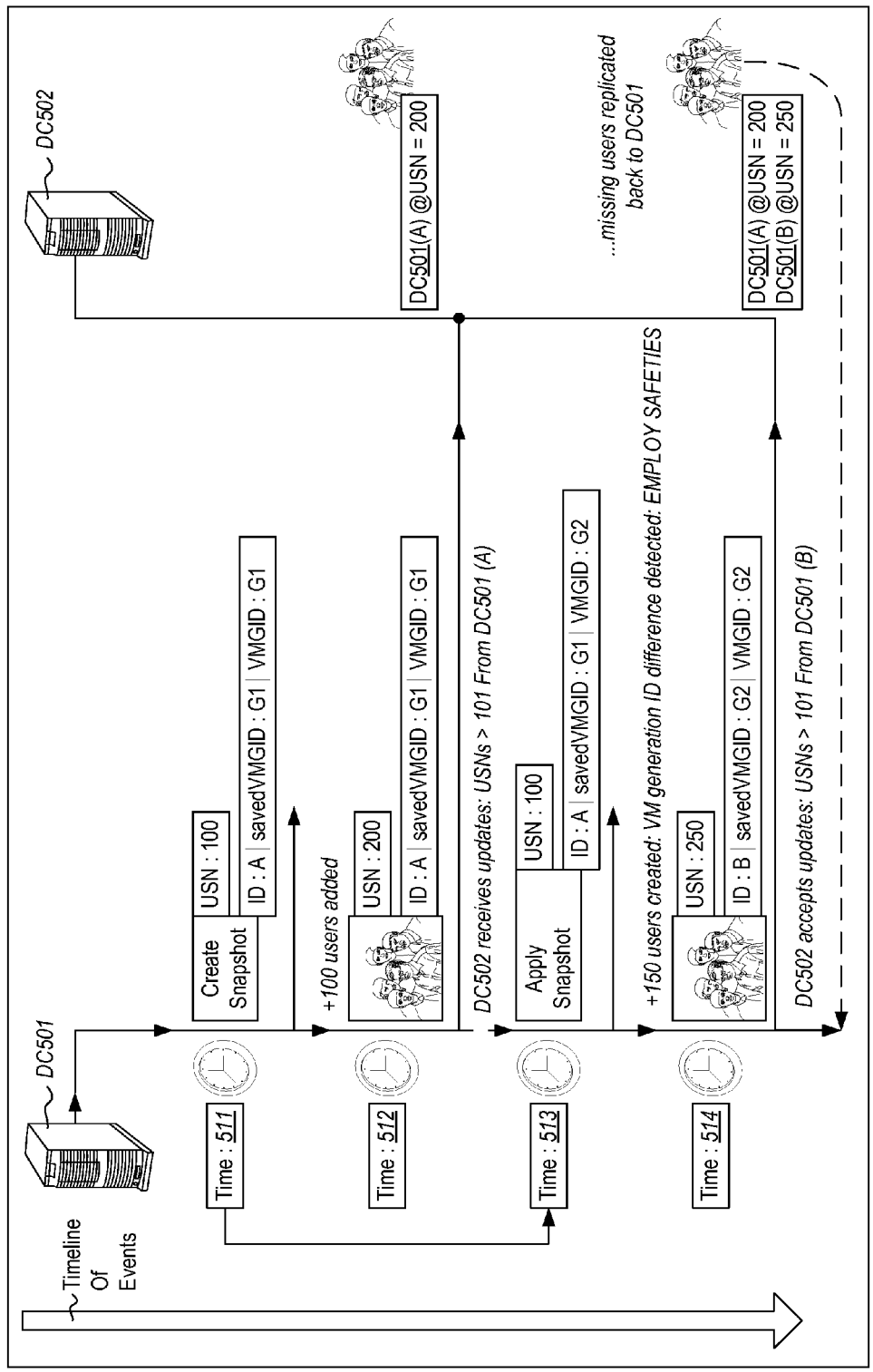

FIG. 5E depicts domain controller 502 saving data indicating that at domain controller 501 for invocation ID B, USN=250. Thus, domain controller 502 maintains two different sets of state, one for invocation ID A and one for invocation ID B. FIG. 5F depicts replication of the data associated with invocation ID A back to domain controller 501. Domain controller 501 can then also maintain two different sets of state, one for invocation ID A and one for invocation ID B.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including one or more processors and system memory, the computer system connected to a network along with one or more other computer systems, a method for maintaining domain controller consistency when a domain controller is rolled back, the method comprising:
at a first logical time:
an act of creating a snapshot for a source domain controller including copying a state of a virtual hard drive of the source domain controller associated with a virtual machine, wherein the source domain controller has an initial invocation ID which is unique to the source domain controller, a saved virtual machine generation ID, and a current virtual machine generation ID, and wherein the saved virtual machine generation ID and the current virtual machine generation ID are consistent at the first logical time;
at a second logical time after the first logical time:
an act of writing first data to the source domain controller to change the state of the source domain controller; and
an act of sending the first data along with the initial invocation ID to a target domain controller so that the target domain controller can save state changes applied at the source domain controller;
at a third logical time after the second logical time:
an act of applying the snapshot at the source domain controller to roll the state of the source domain controller back to a state at the first logical time;
in response to applying the snapshot, an act of changing the current virtual machine generation ID to a new ID;
in response to changing the current virtual machine generation ID, an act of detecting that the saved virtual machine generation ID and the current virtual machine generation ID are inconsistent at the source domain controller;
in response to detecting that the saved virtual machine generation ID and the current virtual machine generation ID are inconsistent:
an act of creating a subsequent invocation ID for the rolled back source domain controller; and
an act of copying the current virtual machine generation ID to the saved virtual machine generation ID; and
an act of receiving second data, the second data received subsequent to the snapshot being applied and subsequent to the second logical time; and
at a fourth logical time after the third logical time:
an act of writing the received second data to the source domain controller to further change the state of the source domain controller; and
and an act of sending the second data along with the subsequent invocation ID to the target domain controller so that the target domain controller can apply additional state changes consistent with the further state changes at the source domain controller, without violating the consistency of state changes associated with the initial invocation ID.

2. The method as recited in claim 1, further comprising:
an act of receiving back the first data along with the initial invocation ID from the target domain controller; and
an act of re-writing the first data to the source domain controller to change the state of the source domain controller.

3. The method as recited in claim 2, further comprising:
an act of maintaining one version of state from the source domain controller by writing the second data and the subsequent invocation ID; and
an act of maintaining another version of state from the source domain controller by re-writing the first data and with the initial invocation ID.

4. The method as recited in claim 1 wherein the act of sending the first data along with the initial invocation ID comprises an act of sending data corresponding to one or more Update Sequence Numbers (USNs).

5. The method as recited in claim 1, wherein an act of creating a subsequent invocation ID comprises an act of creating a subsequent invocation ID that is statistically unique among all other invocation IDs on the network.

6. A computer system connected to a network along with one or more other computer systems, the computer system comprising:
one or more processors; and
system memory having stored computer executable instructions which, when executed by the one or more processors, implement a method for maintaining domain controller consistency when a domain controller is rolled back, the method including:
at a first logical time:
an act of creating a snapshot for a source domain controller including copying a state of a virtual hard drive of the source domain controller associated with a virtual machine, wherein the source domain controller has an initial invocation ID which is unique to the source domain controller, a saved virtual machine generation ID, and a current virtual machine generation ID, and wherein the saved virtual machine generation ID and the current virtual machine generation ID are consistent at the first logical time;
at a second logical time after the first logical time:
an act of writing first data to the source domain controller to change the state of the source domain controller;
at a third logical time after the second logical time:
an act of applying the snapshot at the source domain controller to roll the state of the source domain controller back to a state at the first logical time;
in response to applying the snapshot, an act of changing the current virtual machine generation ID to a new ID;
in response to changing the current virtual machine generation ID, an act of detecting that the saved virtual machine generation ID and the current virtual machine generation ID are inconsistent at the source domain controller;
In response to detecting that the saved virtual machine generation ID and the current virtual machine generation ID are inconsistent:
an act of creating a subsequent invocation ID for the rolled back source domain controller; and
an act of copying the current virtual machine generation ID to the saved virtual machine generation ID; and
an act of receiving second data, the second data received subsequent to the snapshot being applied and subsequent to the second logical time; and
at a fourth logical time after the third logical time:
an act of writing the received second data to the source domain controller to further change the state of the source domain controller; and
an act of sending the second data along with the subsequent invocation ID to the target domain controller so that the target domain controller can apply additional state changes consistent with the further state changes at the source domain controller, without violating the consistency of state changes associated with the initial invocation ID.

7. The system recited in claim 6, wherein the method further comprises:
   an act of receiving back the first data along with the initial invocation ID from the target domain controller; and
   an act of re-writing the first data to the source domain controller to change the state of the source domain controller.

8. The system as recited in claim 7, wherein the method further comprises:
   an act of maintaining one version of state from the source domain controller by writing the second data and the subsequent invocation ID; and
   an act of maintaining another version of state from the source domain controller by re-writing the first data and the initial invocation ID.

9. The system recited in claim 6, wherein the act of sending the first data along with the initial invocation ID comprises an act of sending data corresponding to one or more Update Sequence Numbers (USNs).

10. The system recited in claim 6, wherein the act of creating a subsequent invocation ID comprises an act of creating a subsequent invocation ID that is statistically unique among all other invocation IDs on the network.

11. A memory device having stored computer executable instructions which, when executed by one or more processors of a computing system, implement a method for maintaining domain controller consistency by the computing system when a domain controller is rolled back, the method including:
   at a first logical time:
      an act of creating a snapshot for a source domain controller including copying a state of a virtual hard drive of the source domain controller associated with a virtual machine, wherein the source domain controller has an initial invocation ID which is unique to the source domain controller, a saved virtual machine generation ID, and a current virtual machine generation ID, and wherein the saved virtual machine generation ID and the current virtual machine generation ID are consistent at the first logical time;
   at a second logical time after the first logical time:
      an act of writing first data to the source domain controller to change the state of the source domain controller; and
      an act of sending the first data along with the initial invocation ID to a target domain controller so that the target domain controller can save state changes applied at the source domain controller;
   at a third logical time after the second logical time:
      an act of applying the snapshot at the source domain controller to roll the state of the source domain controller back to a state at the first logical time;
      in response to applying the snapshot, an act of changing the current virtual machine generation ID to a new ID;
      in response to changing the current virtual machine generation ID, an act of detecting that the saved virtual machine generation ID and the current virtual machine generation ID are inconsistent at the source domain controller;
      in response to detecting that the saved virtual machine generation ID and the current virtual machine generation ID are inconsistent:
         an act of creating a subsequent invocation ID for the rolled back source domain controller; and
         an act of copying the current virtual machine generation ID to the saved virtual machine generation ID; and
      an act of receiving second data, the second data received subsequent to the snapshot being applied and subsequent to the second logical time; and
   at a fourth logical time after the third logical time:
      an act of writing the received second data to the source domain controller to further change the state of the source domain controller; and
      an act of sending the second data along with the subsequent invocation ID to the target domain controller so that the target domain controller can apply additional state changes consistent with the further state changes at the source domain controller, without violating the consistency of state changes associated with the initial invocation ID.

12. The memory device recited in claim 11, wherein the method further comprises:
   an act of receiving back the first data along with the initial invocation ID from the target domain controller; and
   an act of re-writing the first data to the source domain controller to change the state of the source domain controller.

13. The memory device as recited in claim 12, wherein the method further comprises:
   an act of maintaining one version of state from the source domain controller by writing the second data and the subsequent invocation ID; and
   an act of maintaining another version of state from the source domain controller by re-writing the first data and the initial invocation ID.

14. The memory device recited in claim 11, wherein the act of sending the first data along with the initial invocation ID comprises an act of sending data corresponding to one or more Update Sequence Numbers (USNs).

15. The memory device recited in claim 11, wherein the act of creating a subsequent invocation ID comprises an act of creating a subsequent invocation ID that is statistically unique among all other invocation IDs on the network.

* * * * *